United States Patent
Paul

(10) Patent No.: US 6,282,897 B1
(45) Date of Patent: Sep. 4, 2001

(54) ADVANCED THERMO-ELECTRONIC SYSTEMS FOR HYBRID ELECTRIC VEHICLES

(76) Inventor: Marius A. Paul, 1120 E. Elm Ave., Fullerton, CA (US) 92631

( * ) Notice: Subject to any disclaimer, the term of this patent is extended or adjusted under 35 U.S.C. 154(b) by 0 days.

(21) Appl. No.: 09/583,103

(22) Filed: May 18, 1998

Related U.S. Application Data

(63) Continuation-in-part of application No. 08/563,923, filed on Nov. 29, 1995, now abandoned.

(51) Int. Cl.⁷ ..................................................... F02B 39/10
(52) U.S. Cl. ......................... 60/598; 60/39.15; 60/39.29; 60/726; 123/565
(58) Field of Search ................................ 60/39.07, 39.15, 60/39.29, 597, 598, 726; 123/565

(56) References Cited

U.S. PATENT DOCUMENTS

| | | | |
|---|---|---|---|
| 2,322,987 | * 6/1943 | West | 60/39.27 |
| 2,365,616 | * 12/1944 | Zweifel | 60/39.15 |
| 2,374,239 | * 4/1945 | Sedille | 60/39.15 |
| 2,457,594 | * 12/1948 | Nettel et al. | 60/39.07 |
| 2,547,093 | * 4/1951 | Ray | 60/39.15 |
| 4,843,813 | * 7/1989 | Paul | 417/407 |
| 5,058,537 | * 10/1991 | Paul et al. | 60/609 |

* cited by examiner

*Primary Examiner*—Michael Koczo
(74) *Attorney, Agent, or Firm*—Richard Esty Peters

(57) ABSTRACT

A hybrid propulsion system for vehicles having an electronic storage and drive system for driving a vehicle and a thermal engine for charging and energizing the electrical storage and drive system, the thermal engine having a thermal energy source with a compressor and turbine combination operating in a Brayton cycle with the compressor being driven by an electrical motor and the turbine driving a generator, the compressor compressing the motive gas which is thermally heated by the thermal energy source and the heated gas expanding in the turbine.

7 Claims, 11 Drawing Sheets

**COMMON SHAFTS-COMPRESSOR AND TURBINE.
CONVENTIONAL CONFIGURATIONS.**

NON REGENERATED CYCLE
TURBINE INLET GAS TEMPERATURE = 2300°F
GAS PRODUCER TURBINE $\eta$ T-T = 86%
POWER TURBINE $\eta$ T-6 = 83%
COMBUSTOR $\Delta$P = 5%

**EFFECT OF COMPRESSOR PERFORMANCE
ON ENGINE CYCLE PERFORMANCE**

COMPARISON OF PART LOAD CONVENTIONAL CONFIGURATION COMMONSHAFT VARIABLE RPM = $f(T_3)$ AND THERMAL ELECTRIC SPLIT SHAFTS, CONSTANT RPM COMPRESSOR, <u>CONSTANT PRESSURE</u> PART LOAD VARIATIONS.

A. CONSTANT PRESSURE CYCLES, HAVING CONSTANT ROTATION COMPRESSORS, INDEPENDANT SHAFTS.

B. HIGHER PRESSURE CYCLES-AT VARIABLE LOAD, GENERATED BY COUNTER ROTATING COMPRESSORS AND COUNTER-ROTATING TURBINES, WITH INDEPENDANT-SPLIT SHAFTS

EFFECT OF GAS TEMPERATURE ON ENGINE CYCLE PERFORMANCE OBJECT OF TOTAL OPTIMIZED THERMO-ELECTRIC COMPOUNDED SYSTEMS.

ADVANCED THERMO-ELECTRONIC SYSTEMS FOR HYBRID ELECTRIC VEHICLES

This application is a continuation-in-part of my application Ser. No. 08/563,923, filed Nov. 29 1995, abandoned.

BACKGROUND OF THE INVENTION

This invention relates to hybrid propulsion systems for vehicles, and in particular to a thermal engine in hybrid electrical propulsion systems. In order to improve the range of an efficient electrical propulsion system, the inclusion of virtually pollutionless thermal engines has been proposed. The hybrid propulsion system is a combination between a thermal engine and an associated electric transmission and storage system. The combined system depends on the efficiency, cost effectiveness and complimentary advantages of each technology with avoidance of any technology-specific disadvantages.

The efficiency of thermal engines, in particular internal combustion engines is compromised by the requirement that the engine operate efficiently under vastly different load and demand conditions. However, with the advent of improved electrical storage systems in the form of advanced battery designs and high density capacitors, a power surge can be instantaneously and effectively delivered to a drive motor to respond to changes in power demand and load. With the thermal engine largely insulated from the instantaneous variations in required performance, the design criteria for the thermal engine can be directed at optimizing the efficiency within the narrow performance range required to replenish electrical power reserves.

SUMMARY OF THE INVENTION

This invention relates to a hybrid propulsion system including a novel centrifugal compressor and turbine combination. In advanced hybrid propulsion systems designed for fuel efficient vehicles and such, the trend has been to develop non-polluting electric vehicles. All-electric vehicles, however, lack the range necessary for general utility. Furthermore, equipping and maintaining vehicles with large battery banks for electricity storage is expensive. Also, while designated zero emission vehicles, the pollution in generating electrical energy is not factored into pollution levels per mile of travel of all-electric vehicles.

The hybrid propulsion system couples fuel-efficient, energy generating systems with electrical propulsion systems. Because the electrical propulsion system draws from the energy storage components for responding to real-time, load and demand requirements, the energy generating components are designed to replenish or keep up with averaged electrical draw.

The attenuating effect of the hybrid system allows thermal engines to be designed for optimized operation within a modulated range of power demands.

In the system devised, the compressor and turbine combination is operated in a Brayton cycle to take advantage of the flat fuel consumption at different loads. Since the system operates at its ideal pressure ratio, efficiency is maximized.

By separately driving the compressor, the optimum pressure is independent of the potential gas expansion, which is dependent on the thermal energy added to the pressurized gas.

The compressor and turbine combination of this invention is designed to operate with a variety of thermal energy sources as described in the detailed description of the preferred embodiments.

DETAILED DESCRIPTION OF THE PREFERRED EMBODIMENTS

Figure 1:
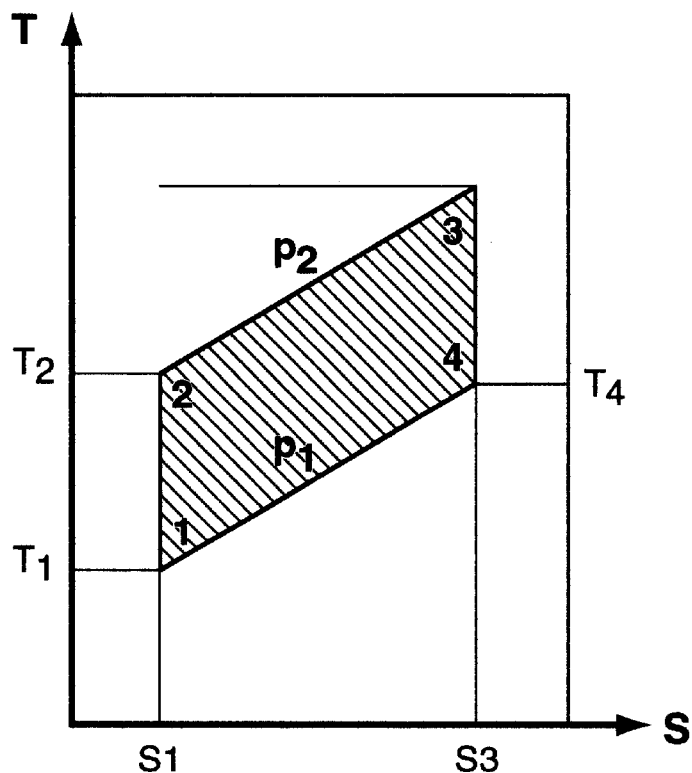
FIG. 1 is a schematic diagram of the Brayton cycle.
Figure 2:
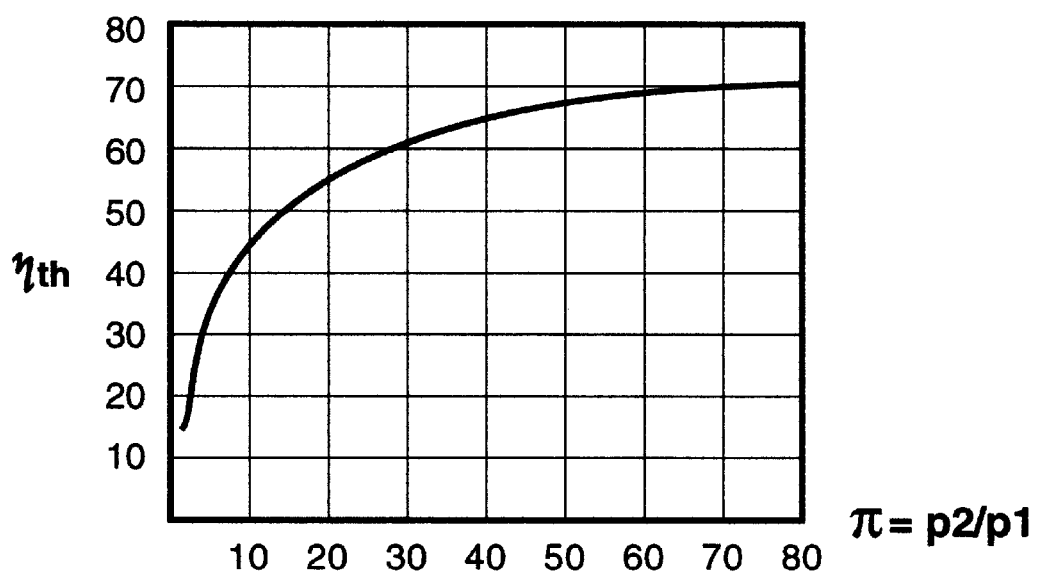
FIG. 2 is a schematic diagram of the efficiency of the Brayton cycle.

This invention relates to a hybrid propulsion system generally designated by the reference numeral 10. In particular, the hybrid propulsion system combines an electrical drive system with a thermal engine charging system. The subject of this invention concerns the combination of a gas compressor with a drive turbine where at least one stage of the drive turbine is directly connected to an electrical generator.

The compressor and turbine combination is designed to operate with the thermal efficiency of the Brayton cycle.

As shown in the schematic diagram of FIG. 1, the cycle operates at constant pressure $P_2$ with the efficiency a direct function of the pressure ratio $P_2/P_1$:

$$\mu t = 1 - \frac{P_2}{P_1} \frac{\gamma - 1}{\gamma}$$

where $P_1$ is the initial pressure, and $P_2$ is the peak pressure and $\gamma$ is the adiabatic/polytropic exponent function of the nature of gases. Where $P_2/P_1$ is variable, depending on load, rotation and turbine inlet pressure, the efficiency varies, compromising optimum performance.

Figure 3:
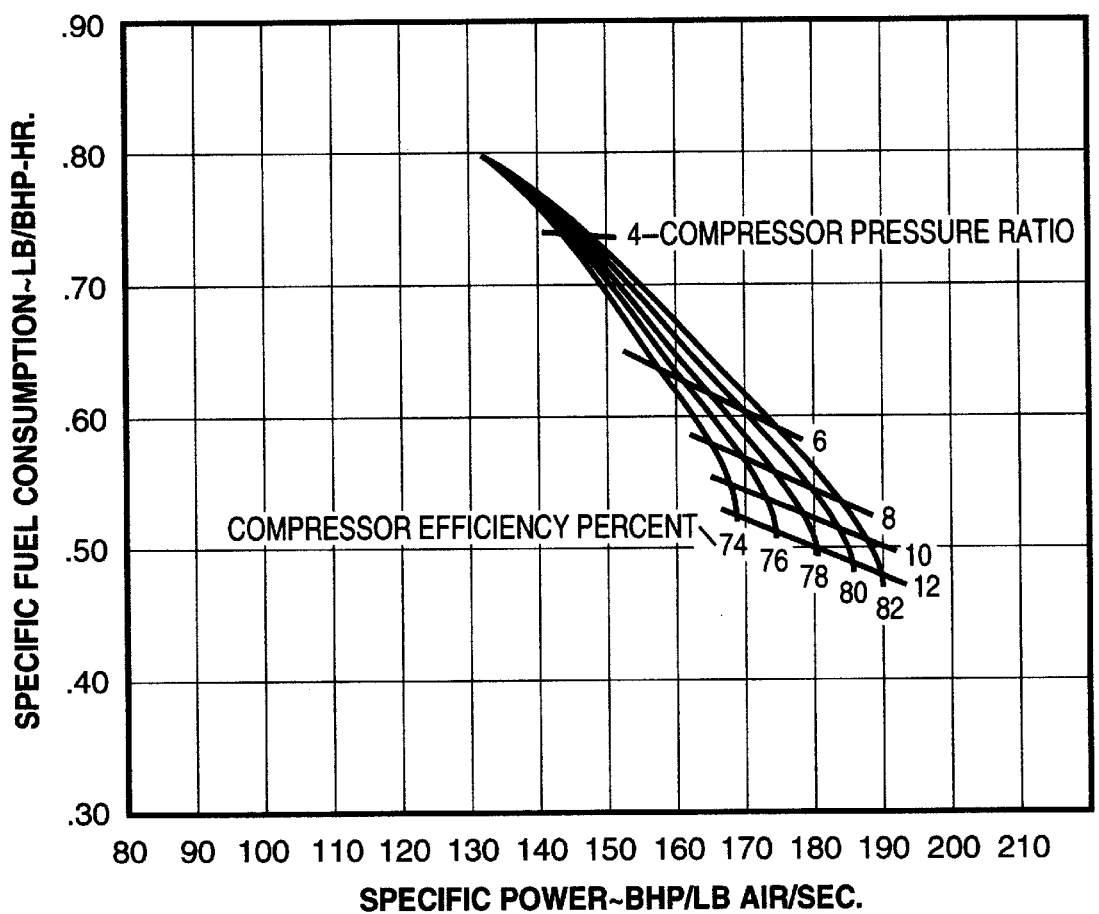
FIG. 3 is a schematic diagram of fuel consumption for a common shaft compressor and turbine combination.

For direct turbine driven compressors, where the shaft of the turbine is directly connected to the shaft of the compressor, optimization for various loads is impossible, as shown in FIG. 3.

Figure 4:
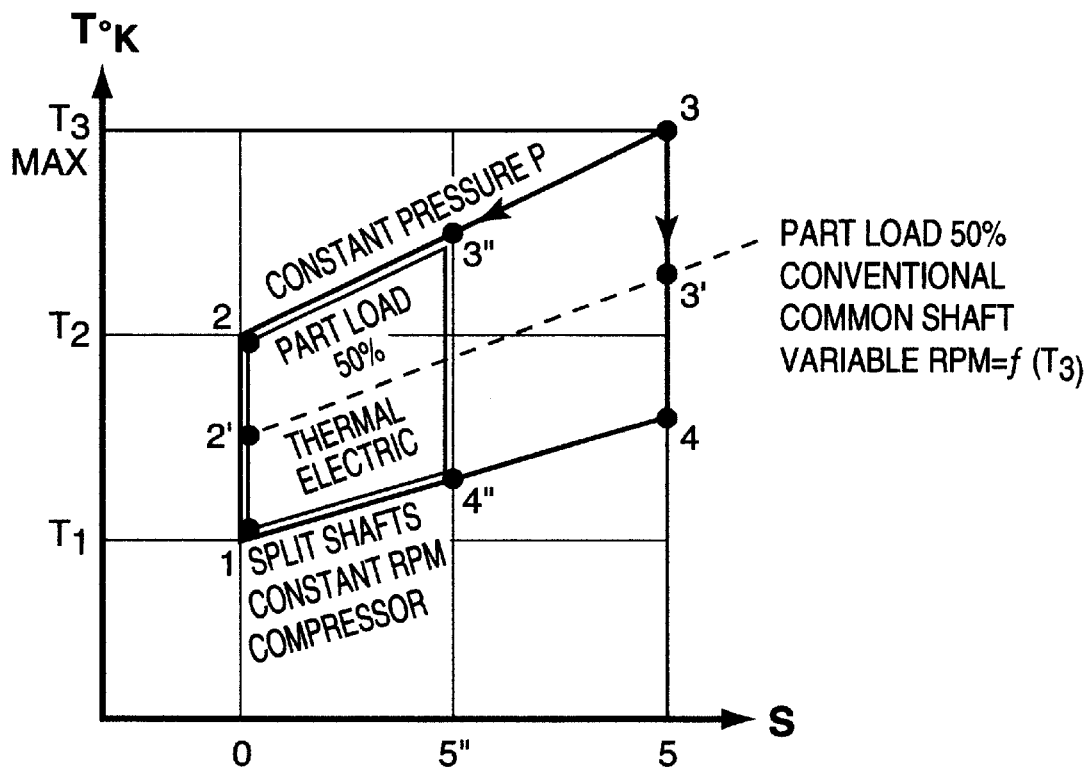
FIG. 4 is a schematic diagram comparing common shaft, split shaft combinations.

A comparison of a connected shaft system and the separate shaft system is shown in FIG. 4, where $T_1$, $P_1$ are atmospheric temperature and pressure, $T_2$, $P_2$ are maximum compressor temperature and pressure, $T_3$, where $P_2=P_3$, is the maximum turbine inlet temperature, and $T_4$, where $P_4=P_1$ is the end of expansion condition.

From this diagram, the resulting useful work of the cycle is represented by the area:

1-2-3-4-1 and the lost (rejected energy) is represented area 0-1-4-5-0

The total energy (thermal) generated by the cycle is the sum of both and the efficiency is the ratio between the total work and the useful work of the cycle:

(1-2-3-4-1)÷(0-1-4-5-0)

However, where the compressor turbine combination has separate shafts for continued operation at constant pressure, at 50% load the work of the cycle is:

1-2-3"-4"-1 and the efficiency is:

(1-2-3"-4"-1)÷(0-1-2-3"-4"-5"0)

Figure 5:
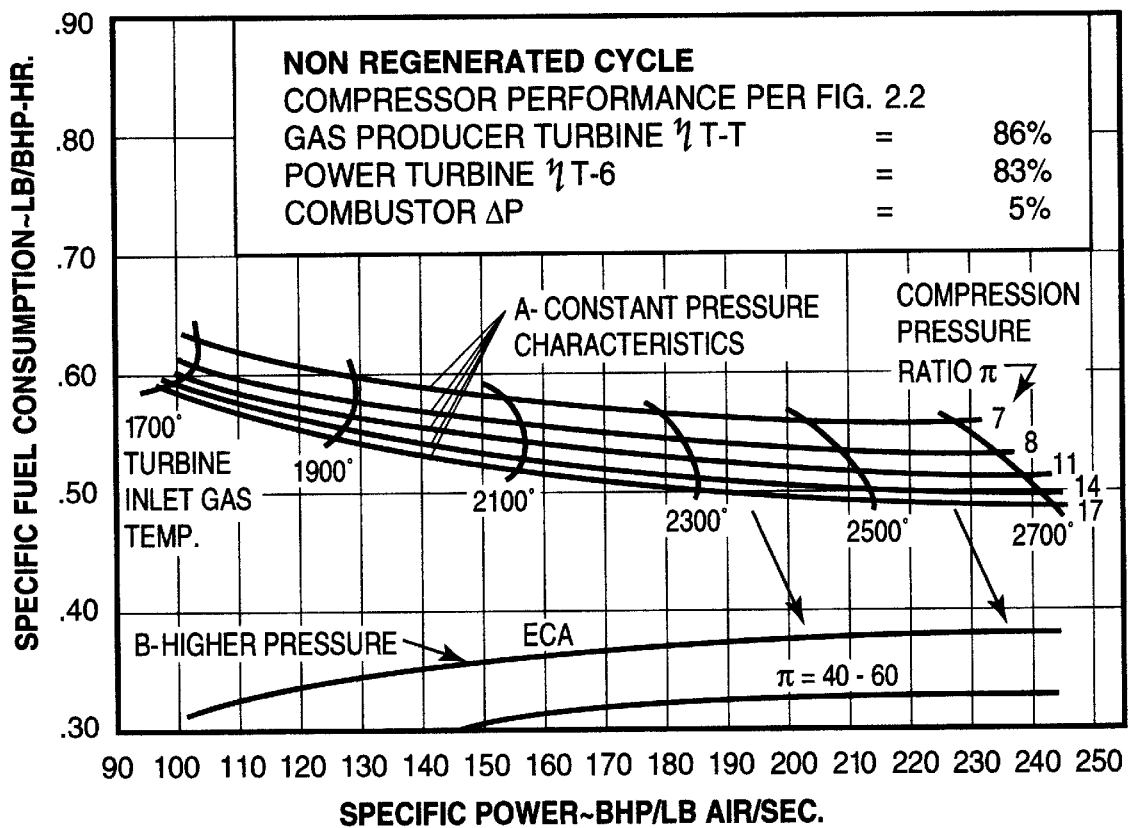
FIG. 5 is a schematic diagram of fuel consumption for split shaft compressor and turbine combinations.

The performance characteristics for constant pressure cycles having constant rotation compressors with shafts independent of the turbine for various gas temperatures are shown in FIG. 5. The characteristics of split-shaft conventional compressor and turbine designs (A) can be enhanced by counter rotating compressors and counter rotating turbines also with split shafts (B).

Figure 6:
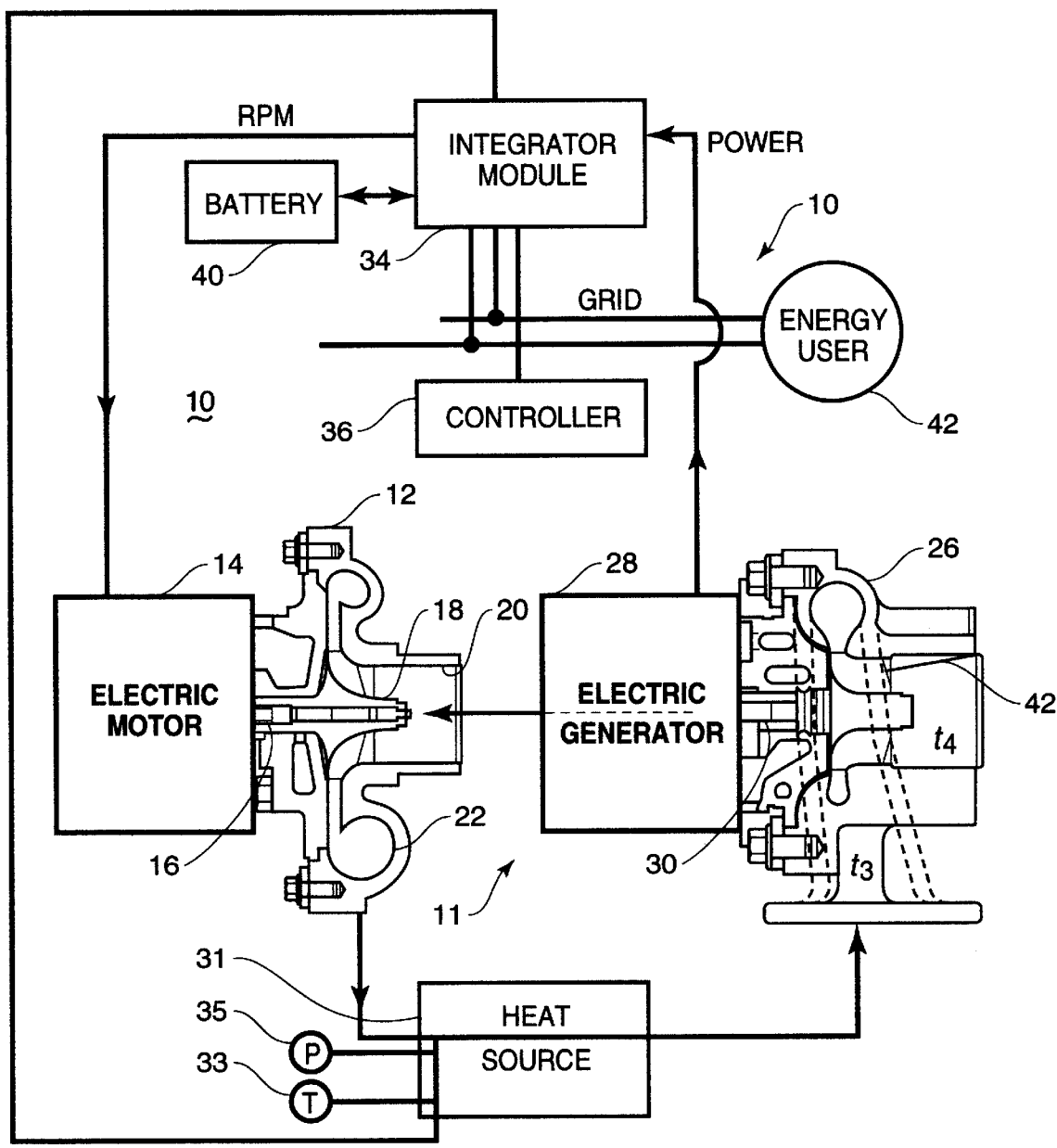
FIG. 6 is a schematic drawing of the propulsion system of this invention.

Referring to FIG. 6, the basic arrangement of the hybrid propulsion system 10 is shown.

Key to the efficient operation of the hybrid propulsion system 10 is a compressor and turbine combination 11 that permits operation conforming to the optimized Brayton cycle. A centrifugal compressor 12 is connected to a small electrical driving motor 14 that is directly connected to the driving shaft 16 of the compressor rotor 18. Air supplied through an intake 20 is compressed and discharged through a discharge orifice 22 and supplied to a heat source 24. When disconnecting the compressor from the turbine portion of the system, the compressor can be operated to achieve the desired design input pressure $P_2$ for optimized operation within the attenuated load range contemplated. The input pressure is sensed at the intake 31 of the heat source 24 by pressure sensor 35 which is electrically connected to the integrator module 34. A temperature sensor 33 monitors temperature as a useful variable when the heat source is an engine for optimizing the operating efficiency of the engine. The heat source 24 elevates the temperature of the gas for expansion through the turbine 26 which is in turn connected to an electric generator 28 through the rotor shaft 30. The compressed and heated air is expanded in the turbine and discharged through discharged orifice 32 to atmosphere. With the turbine shaft 30 disconnected from the compressor shaft 16, the compressor can operate at any desired speed under influence of the electric motor to achieve the specific pressure, p2, desired.

Power is extracted from the system and converted to electrical power by the electric generator 28. The power is passed to an integrator module 34 under control of a controller 36. The controller 36 also processes the output form the sensors 33 and 35 connected to the integrator module 34 and in the case of the pressure sensor 35 compares the data to the specified design pressure $P_2$ that has been programmed into the integrator module. The controller 36 then directs the integrator module to adjust the power to the electric motor 14 to speed up or slow down the rotor 18 of the compressor to bring the sensed pressure to the programmed design pressure to operate the compressor at a substantially constant pressure. The integrator module is a sophisticated regulator that also coordinates the power supply to and from the battery 40 and to the energy user 42. The battery acts as a power sink and the ultimate energy user 42, in the propulsion system, comprises the electrical drive motors for the vehicle. In order that more power be delivered from the electric generator 28 than is consumed by the electric motor 14, thermal energy must be extracted from the heat source 24 to heat the compressed air. Naturally, the more heat that is transferred to the motive gas, the greater the inlet temperature, t3, to the turbine 26 will be, and the greater the amount of work produced by the turbine for conversion into electric energy by the generator.

Figure 7:
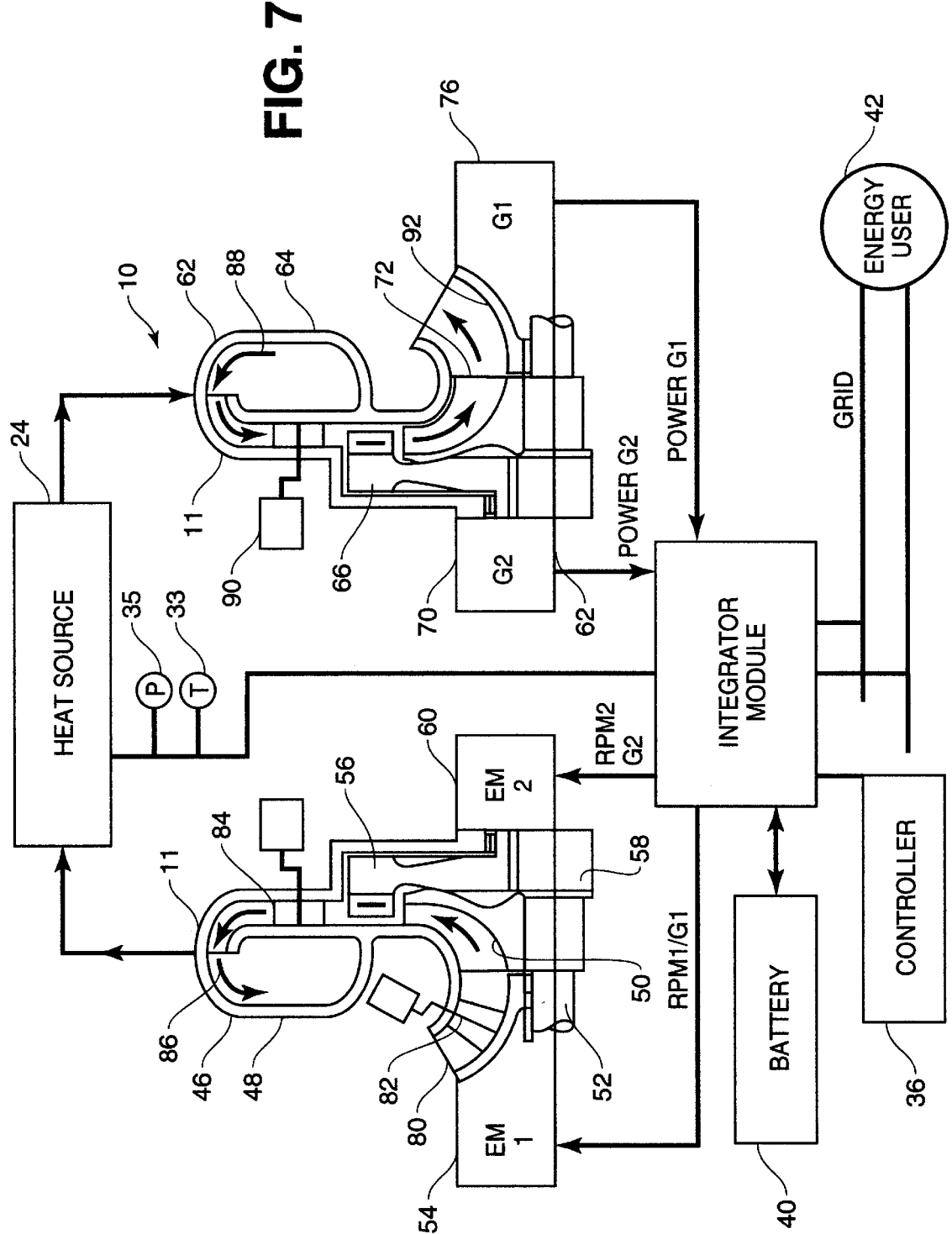
FIG. 7 is an alternate configuration of the propulsion system of FIG. 6.

To improve the efficiency of the turbine and compressor, a turbine and compressor design as described in U.S. Pat. No. 4,843,813 with counter-rotating rotors is preferred. In FIG. 7, the compressor 46 includes a housing 48 with a first rotor 50 on a shaft 52 and by a first electric motor 54, and a second rotor 56 on a shaft 58 driven by a second electric motor 60. In a similar fashion, the turbine 62 has a housing 64 with a first rotor 66 on a shaft 68 connected to a first generator 70, and a second rotor 72 connected to a shaft 74 that is in turn connected to a second generator 76. In each case as described in the referenced patent, the rotors are counter-rotating in order to maximize the speeds of rotation and hence the power delivered to or received from the motive gas.

In the embodiment of FIG. 7, air enters an intake orifice 80 in the compressor and is guided by a remotely controlled deflector vane 82, to the internal rotors 50 and 56 where it is discharged by the remotely controlled deflector vane 84, through discharged conduit 86 where the pressurized air is delivered to the heat source 24. At the heat source 24, thermal energy is transferred to the motive gas which is delivered to the turbine 62 at the intake 88 of the turbine 62 by remotely controlled deflector vane 90, and is expanded through turbine rotors 66 and 72 before exhausting as an expanded gas at discharge opening 92. The driven rotors 66 and 72 are connected to the generators 70 and 76 for transformation of the motive energy to electrical energy. The electrical energy is transmitted to integrator module 34 under control of controller 36 for supply of electrical power to the battery 40, the energy user 42 and the compressor motors 54 and 60.

Figure 8:
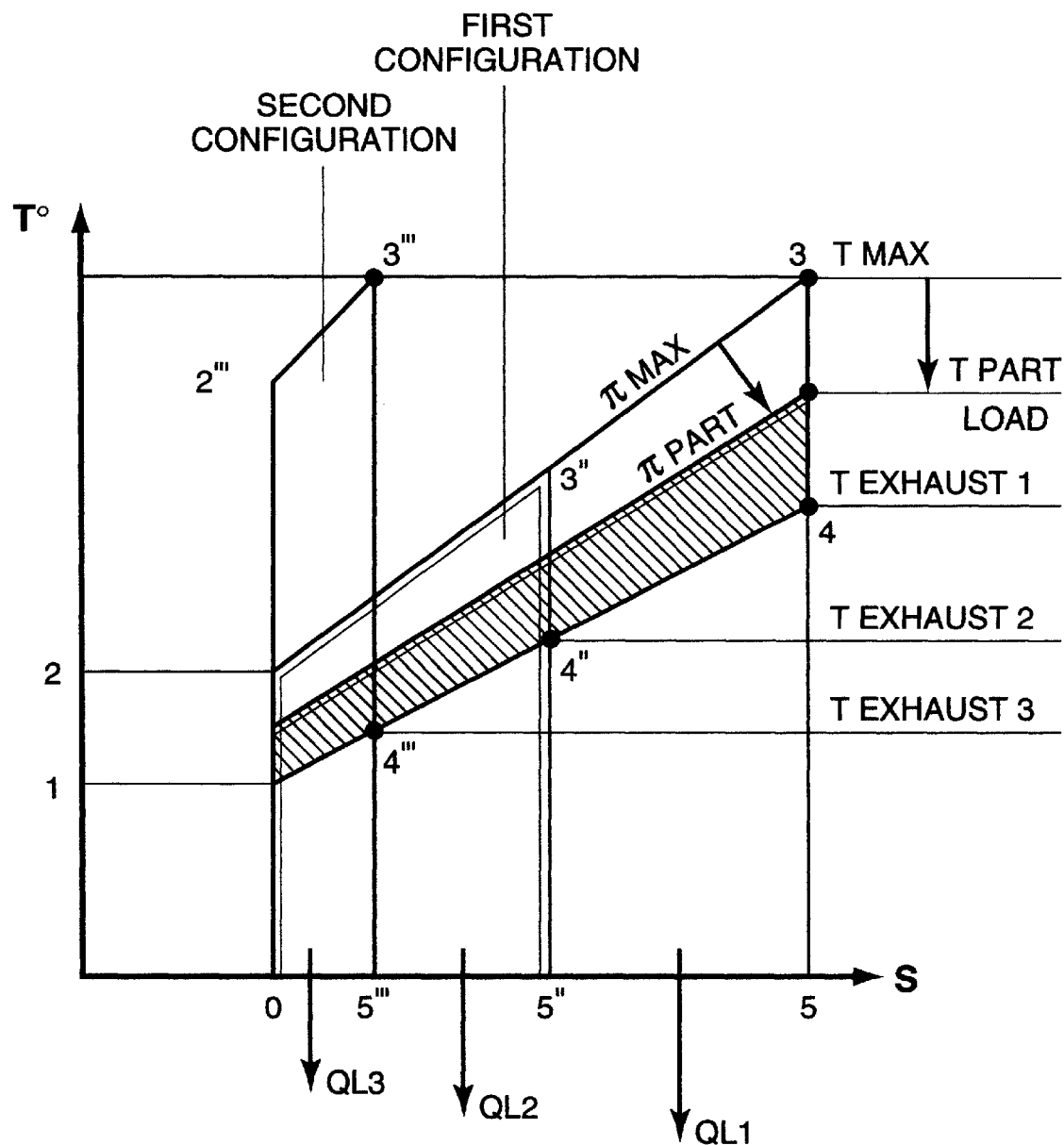
FIG. 8 is a schematic diagram of the cycle of the propulsion system of FIG. 7.

Because the compressor is operated independently of the turbine, the optimum constant pressure for the compressor is preset by a predefined program in the integrator module 34 for the projected operating conditions of the system. The operating temperature and pressure at the heat source 24 are monitored by the integrator module 34 through temperature sensor 33 and pressure sensor 35. The remotely controlled vanes 82 and 84 can be systemically adjusted for the particular speed and effective pressure selected for optimized operation. Because the system is designed for operation at substantially constant pressure, a substantially flat fuel consumption results from variations in the power demands at the turbine which are met by increasing the heat transfer at the heat source. The cycle diagram for the FIG. 7 configuration is shown in FIG. 8. The heat source 24 may be a simple heat exchanger or preferably an efficient fuel burner as shown in FIG. 9.

Figure 9:
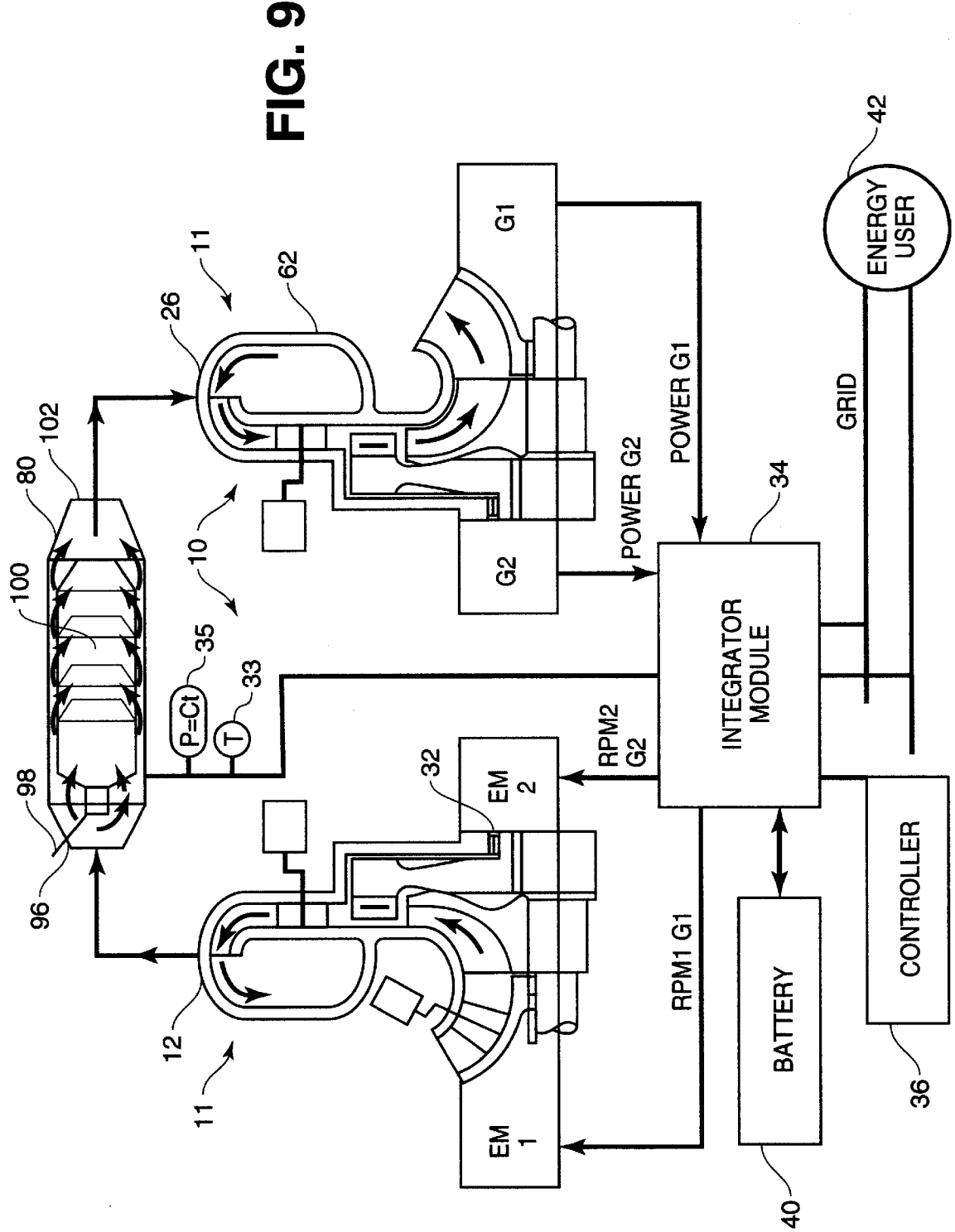
FIG. 9 is an alternate embodiment of the propulsion system of FIG. 7 showing a fuel combustor.

In FIG. 9, the air is supplied at one end of the fuel burner 96 and fuel is supplied through a supply line 98 to mix with the air in the body of the burner 100 before being discharged at high velocity at the discharge nozzle 102 and supplied to the driving turbine 62.

Figure 10:
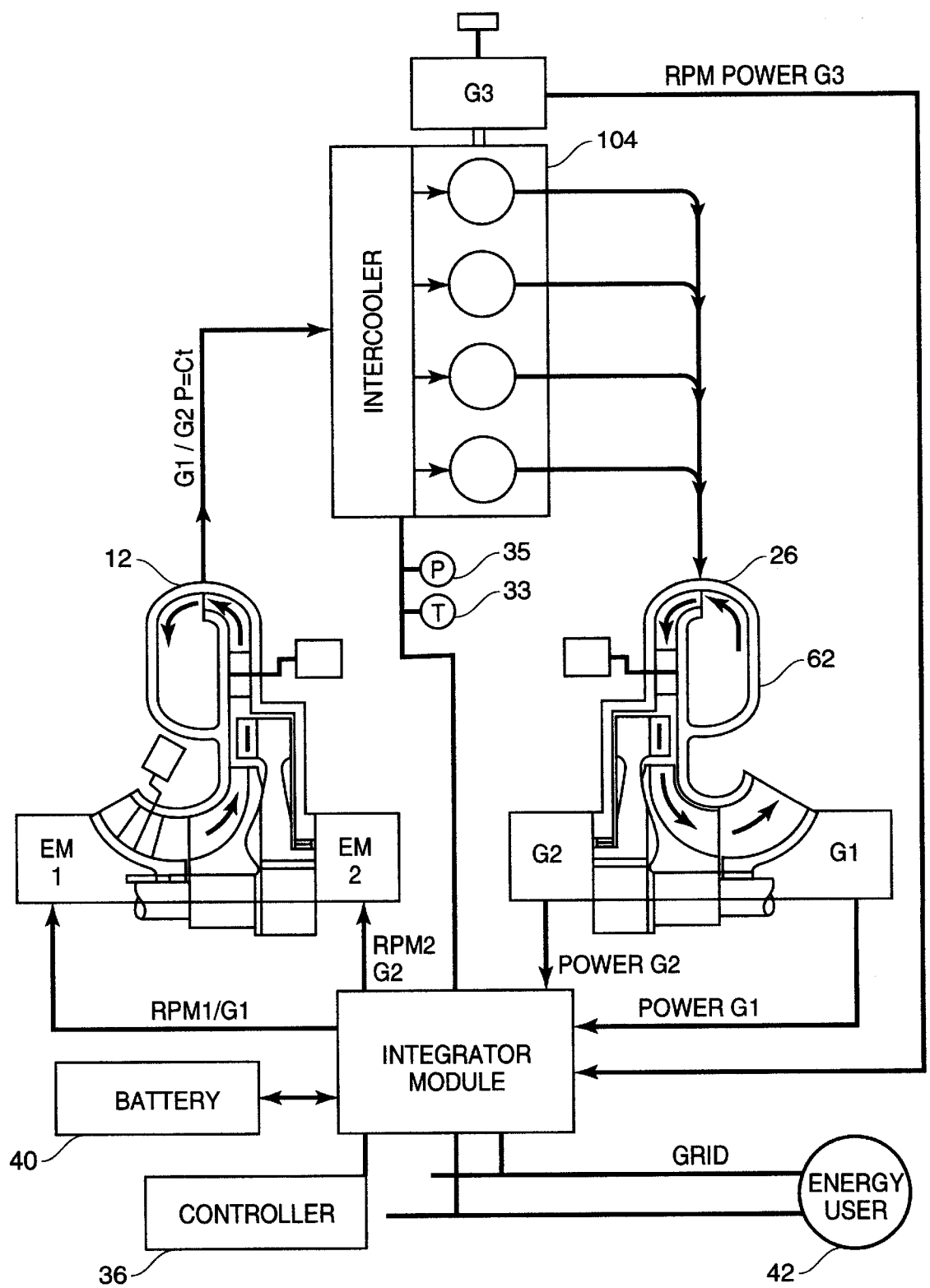
FIG. 10 is an alternate embodiment of the propulsion system of FIG. 7 showing a conventional reciprocal engine.

The heat source can also be a conventional reciprocal engine as shown in FIG. 10, where additional power is extracted from the supplied fuel before the compressed and expanded gas in the reciprocal engine is expanded through the turbine 62 as previously described. As noted, when the heat source is an engine, the temperature sensor 33 as well as the pressure sensor 35, is useful in the efficient operation of the system.

Figure 11:
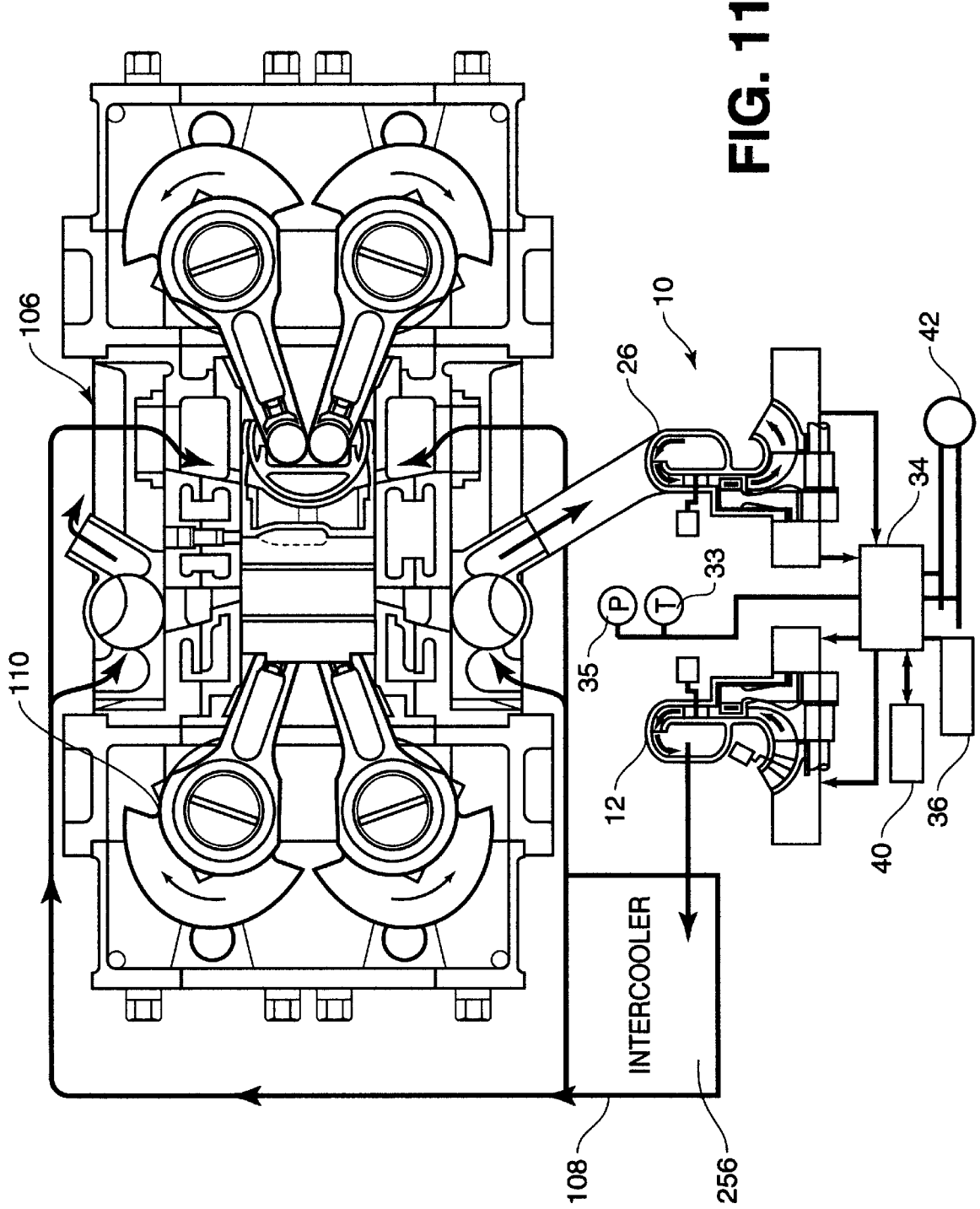
FIG. 11 is an alternate embodiment of the propulsion system of FIG. 7 showing an opposed piston engine.

As shown in FIG. 11, the preferred configuration of the internal combustion engine is an opposed piston engine 106 of the type described in U.S. Pat. No. 5,056,314, issued Oct. 15, 1991 entitled, "Internal Combustion Engine With Compound Air Compression". In this configuration, the internal combustion engine is a super high compression engine and intercooling of the gases compressed by the compressor in an intercooler 108 is performed before delivery to the internal combustion engine to maximize the density of air delivered to the opposed piston reciprocator 110 for further compression.

Figure 12B:
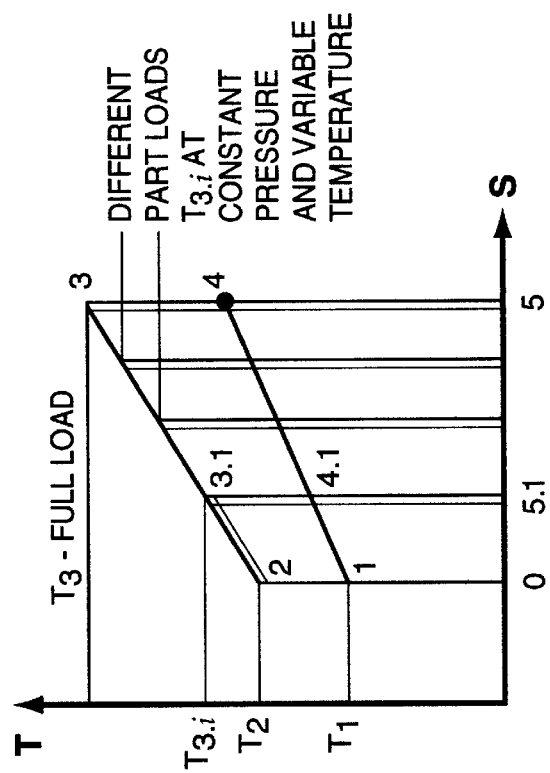
FIG. 12B is a schematic diagram showing the cycle of the system of FIG. 12A.
Figure 12A:
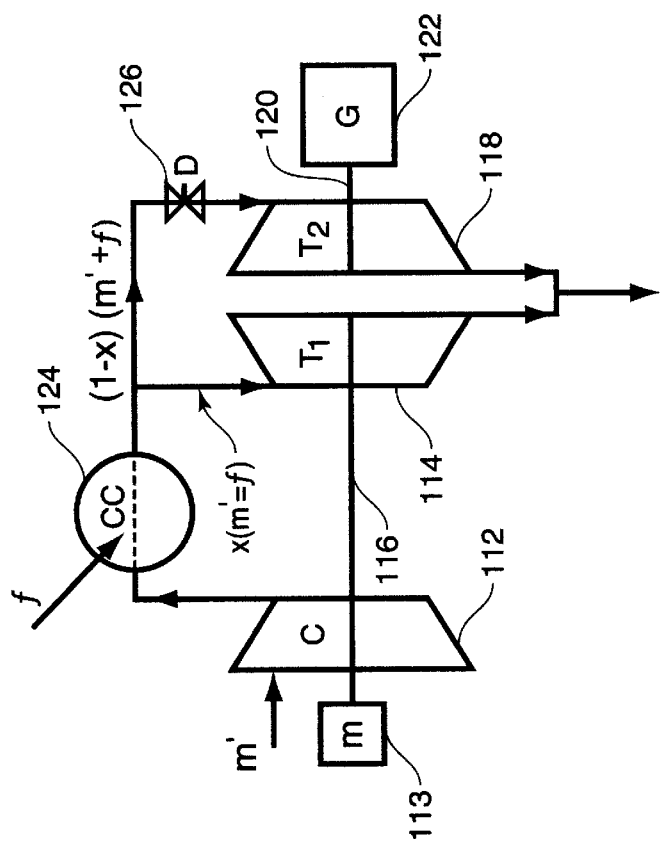
FIG. 12A is a schematic drawing of an alternate embodiment of the propulsion system showing two turbines.

Referring now to FIGS. 12A and 12B, an alternate embodiment of the compressor and turbine combination 11 is schematically shown and diagrammatically defined. In FIG. 12A, a compressor 112 with electric motor 113 and a first turbine 114 have a common shaft 116 and function as a conventional turbine driven compressor. A second turbine 118 is associated with the first turbine 114, but has a shaft 120 connected to an electrical generator 122.

A heat source 124, thermally heats the motive gas from the compressor 112, and where air is compressed the heat source may comprise an internal combustion engine or fuel burner. A control nozzle 126 diverts the compressed and thermally heated motive gas to the second turbine 118 to drive the generator 122 with the remaining gas being supplied to the first turbine 114 to maintain turbine speed for the desired pressurization.

In effect, the common compressor produces compressed gas with m mass flow at any constant pressure $P_2$ to the heat source. In the case where fuel is combusted with compressed air in the heat source, the products of combustion m' (air) f (fuel) are divided by the control valve with $\chi$ (m+f) driving the first turbine connected to the compressor and (1–X)× (m'+f) driving the second turbine connected to the generator, i.e., the useful work.

The basic thermodynamic law of conservation of energy expresses the relationship by the equation:

$$\frac{(m'+f)\sqrt{T_{3.1}}}{A_1 \times P_{2-3}} = \frac{(m'+f+\Delta f) \times \sqrt{T_{3.1} + \Delta T_3}}{(A_1 + \Delta A_1) \times P_{2-3}}$$

The left of the equation expresses the power engine of the group driving the compressor and the right expresses the power regime in which the added fuel $\Delta f$ produces a temperature rise $\Delta T_3$, requiring bypass gate $\Delta A_1$, to direct pressurized gases to the generator turbine. The bypass gate is a variable size nozzle for effectively delivering the supplementary gases to operate the generator. The optimized design of the compressor for a predetermined pressure allows a desired constant pressure ratio to be utilized for maximum efficiency with a large variation in the power from full load to partial load as shown in FIG. 12B. The system operates in a Brayton cycle similar to the diesel engine cycle with flat specific fuel consumption.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. In a hybrid propulsion system having an electrical storage and drive system, an improved thermal engine comprising:

a. thermal energy source;

b. a Brayton cycle compressor and turbine combination wherein during operation the combination has a substantially constant pressure compressor and a substantially constant pressure turbine, wherein the compressor has a drive shaft with an electric motor connected to the drive shaft and the turbine has a driven output shaft for mechanical output disconnected from the drive shaft of the compressor, wherein the compressor compresses motive gas, the thermal energy source heats the compressed motive gas from the compressor, and the turbine receives heated motive gas from the thermal energy source, the turbine having an output dependent on the amount of thermal energy transferred to the motive gas by the thermal energy source; and c. an integrator module under control of a controller, the integrator module, having a predefined program means for operating the compressor at a specific, substantially constant pressure optimized for the projected operating conditions of the propulsion system.

2. The hybrid propulsion system of claim 1 wherein the turbine includes a generator connected to the driven shaft of the turbine and the turbine drives the generator.

3. The hybrid propulsion system of claim 1 wherein the thermal energy source comprises a fuel combustor.

4. The hybrid propulsion system of claim 1 wherein the thermal energy source comprises a reciprocal engine.

5. The hybrid propulsion system of claim 4 wherein the reciprocal engine is an opposed piston engine.

6. The hybrid propulsion system of claim 1 wherein the compressor has counterrotating rotors and the turbine has counterrotating rotors.

7. The hybrid propulsion system of claim 1 wherein the compressor includes a turbine with a driven shaft connected to the drive shaft of the compressor to assist the electric motor in driving the compressor, and the thermal source includes gas diversion means to divert heated gas in part to the turbine connected to the compressor to drive the compressor and in part to the turbine disconnected from the compressor to drive the driven output shaft.

* * * * *